United States Patent [19]

Gat et al.

[11] Patent Number: 4,762,992

[45] Date of Patent: Aug. 9, 1988

[54] ERROR DETECTION SYSTEM FOR TWO-STATE FIBER OPTIC SENSORS

[75] Inventors: Erann Gat; Eric D. Park, both of Blacksburg; Talmage Mathis, Lafayette, all of Va.

[73] Assignee: Kollmorgen Corporation, Simsbury, Conn.

[21] Appl. No.: 60,213

[22] Filed: Jun. 10, 1987

[51] Int. Cl.$^4$ ............................................... H01J 5/16
[52] U.S. Cl. .................... 250/227; 250/214 R
[58] Field of Search ............... 250/227, 231 R, 231 P, 250/229, 214 R, 214 RC

[56] References Cited

U.S. PATENT DOCUMENTS 4,449,043  5/1984  Husbands ............................ 250/227
4,574,192  3/1986  Kitagawa et al. ................... 250/227

Primary Examiner—David C. Nelms
Attorney, Agent, or Firm—Morgan & Finnegan

[57] ABSTRACT

An error detection system is provided for a two-state fiber optic sensor. An amplified photodetector signal is sampled by each of an ON-OFF threshold detector, a disconnect threshold detector and a slope detector. The ON-OFF threshold detector monitors whether the detector signal is above or below an ON-OFF threshold value corresponding to the parameter being sensed and activates an appropriate sensor output. The disconnect threshold detector monitors the constant low level detector signal corresponding to low level light received by the detector even when the thresold detector is in the OFF state, and triggers an error signal should the detector signal fall below a disconnect threshold value. The slope detector monitors the rate of change of the detector signal. Where the detector signal changes rapidly, such as during normal sensor switching, the slope detector permits the detector signal to pass to a latch, which retains in memory the last detector signal which changed rapidly enough to trigger the slope detector and produces an output corresponding to the ON-OFF status of the last detector signal in memory. A slowly changing detector will not trigger the slope detector. Where the outputs of the ON-OFF threshold detector and the latch differ, a comparator triggers an error signal.

12 Claims, 1 Drawing Sheet

ERROR DETECTION SYSTEM FOR TWO-STATE FIBER OPTIC SENSORS

TECHNICAL FIELD

The present invention relates to error detection systems and, more particularly, to an error detection system for a two-state fiber optic sensor.

BACKGROUND AND OBJECTS OF THE INVENTION

Fiber optic sensors are devices which measure some physical quantity using a modulated optical signal. Generally, in a fiber optic sensor an optical signal is transmitted through an optical fiber to a transducer which modulates the optical signal in a manner corresponding to the condition being monitored. The modulated light is then transmitted through a return optical fiber for detection so that the detected signal can be used to display the condition of the physical parameter being measured and/or for use in apparatus or process control.

A special class of the fiber optic based sensor is the two-state fiber optic sensor used for monitoring a parameter which may only be in one of two states. By way of example, such sensors include fiber optic based switches which can be either ON or OFF, such as fluid sensors which indicate the presence or absence of fluid at a particular sensing location. One such fluid sensor is disclosed in co-pending U.S. patent application Ser. No. 06/915,159 filed on Oct. 3, 1986 for FIBER OPTIC FLUID SENSOR.

Two-state fiber optic sensors operate by comparing the amount of optical power received by a detector to a preset threshold value. If the detector signal corresponding to the light received is above the threshold value the sensor output is set to one state, whereas if the detector signal is below the threshold value the sensor output is set to the other state. For simplicity, the state where the return signal is above the threshold value may be referred to as the "ON" state and the state where the return signal is below the threshold value may be referred to as the "OFF" state. By way of example, in a fluid sensor the presence of the fluid at a particular sensor location might create an ON condition signal above the threshold value whereas the absence of the fluid might give rise to a detector signal below the threshold value, creating an OFF condition.

Unfortunately, however, two-state fiber optic sensors cannot distinguish an OFF return signal from a sensor system failure, e.g. where the light source burns out or a fiber optic link breaks or becomes disconnected. It has heretofore been known that a small amount of error detection can be obtained by adding a second optical channel devoted to monitoring the state of the sensor system. This approach is of limited value. First, a failure in the error detection channel is not necessarily indicative of a failure in the sensing channel and vice versa. Second, adding a second sensor channel to the sensor system undesirably increases the cost, size and weight of the sensor.

Two-state fiber optic sensors also suffer from gradual system degradation short of system failure which may nonetheless result in erroneous ON-OFF sensor indications. Such a gradual failure can, for example, result from decreased optical efficiency caused by an accumulation of dirt on electro-optical surfaces or other factors resulting in degradation of electro-optical elements. A dedicated error detection channel is not useful for monitoring gradual system failure and is itself subject to this very limitation.

Therefore, it is one object of the present invention to provide an error detection system.

It is a further object of the present invention to provide an error detection system which is particularly useful with a two-state fiber optic sensor.

Another object of the present invention is to provide, in a two-state fiber optic sensor, an error detection system capable of recognizing a total sensor system failure.

Yet another object of the present invention is to provide, in a two-state fiber optic sensor, an error detection system capable of recognizing a change in sensor state caused by gradual sensor degradation.

It is yet a further object of the present invention to provide an error detection system capable of recognizing total sensor failure or gradual sensor degradation without adding appreciably to the cost, size or weight of the sensor.

These and other highly desirable and unusual results are accomplished by the present invention in an economical structure which accurately determines whether either total or gradual system failure has occurred.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations, steps, and improvements herein shown and described.

SUMMARY OF THE INVENTION

In accordance with the present invention an error detection system is provided which is capable of recognizing both complete sensor breakdown and gradual sensor failure in a fiber optic sensor. The error detection system according to the present invention is particularly useful with two-state fiber optic sensors and, advantageously, does not require additional fiber optic sensor channels.

In the preferred embodiment of the present invention the return optical signal in a two-state fiber optic sensor is detected by a photodetector and amplified. The amplified detector signal is then furnished to the ON-OFF threshold detector/error detection system. The amplified detector signal is connected to an ON-OFF threshold detector which compares the detector signal to a preset threshold value corresponding to the parameter being measured. The output of the ON-OFF threshold detector indicates the status of the parameter being monitored by the sensor. The amplified detector signal is also furnished to a disconnect threshold detector and to a slope detector/latch combination for error detection purposes.

The disconnect threshold detector is a two-state threshold detector similar to the ON-OFF threshold detector. However, the disconnect threshold detector is constructed to monitor a low level detector signal generated by the detector in response to the constant low level optical signal which occurs in the fiber optic sensor even when the ON-OFF threshold detector is in the OFF state. Should any component of the sensor, such as the light source or an optical fiber, fail or become disconnected the constant low level optical signal will drop below the disconnect threshold and the output of the disconnect threshold detector will be activated to trigger an error signal. Thus, the error detection system according to the present invention is advantageously capable of distinguishing between an OFF state and a sensor failure.

The amplified detector signal is also sampled by a slope detector/latch which monitor the detector signal for gradual sensor failure. The slope detector is constructed so as to permit only a rapidly changing signal to pass to the latch. Thus, when the sensor changes state rapidly during normal operation, which typically requires less than one second, the slope detector permits the amplified detector signal to pass to the latch. However, where the sensor state changes more slowly, such as during gradual degradation of electro-optical elements, the slope detector does not permit the amplified detector signal to pass to the latch. The latch in turn acts as a memory device which stores the last signal which was rapid enough to trigger the slope detector, whether it be an ON or OFF signal level, and produces an output of the corresponding ON or OFF signal. A first comparator receives the output of both the latch and the ON-OFF threshold detector. Where both signals are the same, i.e. where a rapid change in sensor state has occurred and both the latch and ON-OFF threshold detector have received the same detector signal and are in the same state, the output of the first comparator is zero. On the other hand, where the two signals are different the first comparator produces a signal which activates an error signal. The latter situation involving two different signal states occurs when gradual system failure has occurred. In that situation the detector signal gradually slips below the threshold value of the ON-OFF threshold detector, causing the ON-OFF threshold detector to change state. However, since the change in detector signal has been gradual, the slope detector has not passed the new detector signal to the latch. Consequently, the output of the latch will correspond to the signal level which last triggered the slope detector and will not match the output of the ON-OFF threshold detector. Thus, the slope detector/latch combination remarkably permits the first comparator to distinguish between a valid change in sensor state and a change in state due to gradual sensor degradation.

It will be readily appreciated that the error detection system according to the present invention advantageously detects both total sensor failure due to disconnection or breakdown and gradual sensor failure due to degradation of electro-optical surfaces. Remarkably, these highly desirable results are obtained without adding appreciably to the size, weight or cost of the sensor. In addition, the error detection system does not require addition of any fiber optic channels to a fiber optic sensor.

It will be understood that the foregoing general description and the following detailed description as well are exemplary and explanatory of the invention but are not restrictive thereof.

BRIEF DESCRIPTION OF THE DRAWINGS

The accompanying drawings, referred to herein and constituting a part hereof, illustrate preferred embodiments of the product of the present invention, and together with the description serve to explain the principles of the invention, in which.

DETAILED DESCRIPTION OF THE PREFERRED EMBODIMENTS

Figure 1:
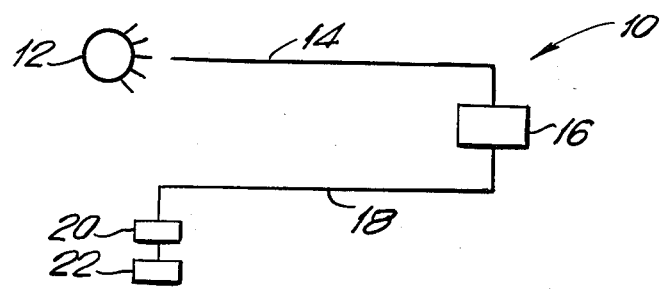
FIG. 1 is an optical schematic diagram of a fiber optic sensor.
Figure 2:
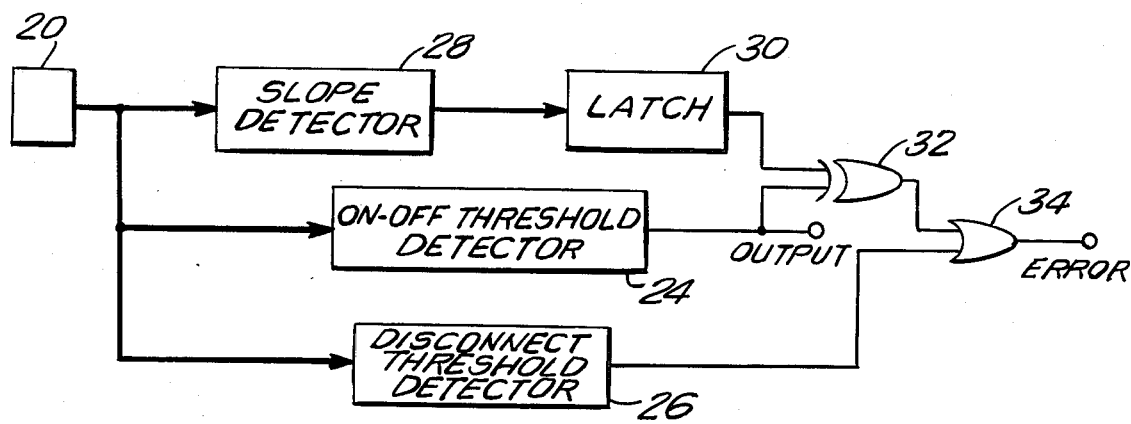
FIG. 2 is a block diagram of an error detection system in accordance with the present invention.

Referring now to the drawings, a two-state fiber optic sensor 10 is shown having a source of optical energy 12 (referred to hereinafter for convenience but not by way of limitation as a "light source" which produces "light" received by other elements of the sensor system), a source optical fiber 14, a transducer 16, a return optical fiber 18, a detector 20, and a threshold/error detector system 22. As shown in FIG. 2, the threshold/error detector system includes an ON-OFF threshold detector 24, a disconnect threshold detector 26 and a slope detector 28. Threshold detector 24 assumes either an ON or OFF status which is displayed as the output of the sensor corresponding to the physical parameter being monitored by the sensor. That is, when the detector signal is above the threshold value of threshold detector 24 the output of the threshold detector goes "high", indicating an ON state, and when the signal is below the threshold value the threshold detector output is "low", indicating an OFF state. In accordance with the present invention, the signal received from detector 20 is also sampled by disconnect threshold detector 26 and by slope detector 28. Disconnect threshold detector 26 determines whether a total sensor failure has occurred and slope detector 28 determines whether a gradual sensor failure has occurred. As shown in FIG. 1 and described below, the output of slope detector 28 is fed to a latch 30 and the outputs of both latch 30 and ON-OFF threshold detector 24 are fed to a first comparator 32. The outputs of the first comparator and disconnect threshold detector 26 are fed to a second comparator 34, which in turn is connected to an error signal.

In a two-state fiber optic sensor the ON-OFF threshold is set at an appropriate level to indicate the presence or absence of the parameter of interest. However, in a fiber optic sensor there is usually a low level of light returning from the transducer even when the ON-OFF threshold sensor is in the OFF state. This low level light is normally well below the threshold value of the ON-OFF threshold detector and therefore does not impair proper operation of the sensor. Nonetheless, this low level of light is constantly returned to the detector. In accordance with the present invention, disconnect threshold detector 26 monitors this low level of returning light to ensure that no failure has occurred in any of the sensor components. The disconnect threshold detector is itself a two-state detector in which the disconnect threshold value is set at a value higher than the substantially zero signal level produced when the sensor is broken or disconnected but below the low level of light constantly returned when the sensor is operationally intact. Unlike ON-OFF threshold detector 24, however, disconnect threshold detector 26 is preferably configured so that the output of disconnect threshold detector 26 goes "high" only when the return signal drops below the disconnect threshold. That is, the output of the disconnect threshold detector is only activated when the sensor is disconnected or broken. Of course, it is contemplated that an optical transducer which does not normally provide a constant low-level return signal could be modified to do so for error detection purposes.

The detection of gradual system failure due, for example, to an accumulation of dirt on electro-optical surfaces is more complex. However, the normal switching time of a two-state fiber optic sensor is relatively fast, typically occurring in less than one second, so a gradual system failure can be detected by monitoring the rate of change of the sensor from one state to another. A change in sensor state which occurs over a greater period of time than expected for normal sensor switching indicates that something other than a change in the physical parameter being observed, such as a gradual sensor failure, has triggered the change in ON-OFF threshold detector status.

As shown in FIG. 2, the input from detector 20 is also sampled by slope detector 28, which monitors the rate of change of the detector signal. Only when the detector signal changes rapidly, i.e. where normal ON-OFF sensor switching has occurred, does the slope detector permit the detector signal to pass to latch 30. Latch 30 acts as a memory of the last transition which was fast enough to trigger slope detector 28. The ON-OFF output of latch 30 corresponding to the last signal received from slope detector 28 remains constant unless a rapidly changing input signal gets through slope detector 28 and changes the status of the latch. The output of latch 30 is fed to the first comparator 32, which also samples the output of ON-OFF threshold detector 24, i.e. the output of the sensor. As long as the two inputs to first comparator 32 are the same, the output of comparator 32 is zero. However, when the input received from the ON-OFF threshold detector differs from the output of latch 30, the output of comparator 32 triggers an error signal. The latter situation will occur when the sensor gradually deteriorates until the detector signal slips below the threshold value of the ON-OFF threshold detector. In that case, since the change has occurred gradually slope detector 28 will not be triggered and the output of latch 30 will remain constant while the output of ON-OFF threshold detector 24 will have changed. Under these circumstances the discrepancy between the ON-OFF threshold detector output and the latch output indicates a gradual sensor system failure which will be indicated by the output of the first comparator 32.

As shown in FIG. 2, the output of the first comparator 32 may be fed to a second comparator 34, which also receives the output of disconnect threshold detector 26. In this configuration the second comparator 34, which may simply be an exclusive "or" gate, triggers an error signal when either input thereto indicates a sensor failure. Of course, the latch and the disconnect threshold detector could also be connected to dedicated error signals, which may be desirable in order to inform the user whether a disconnect or gradual failure has occurred.

Figure 3:
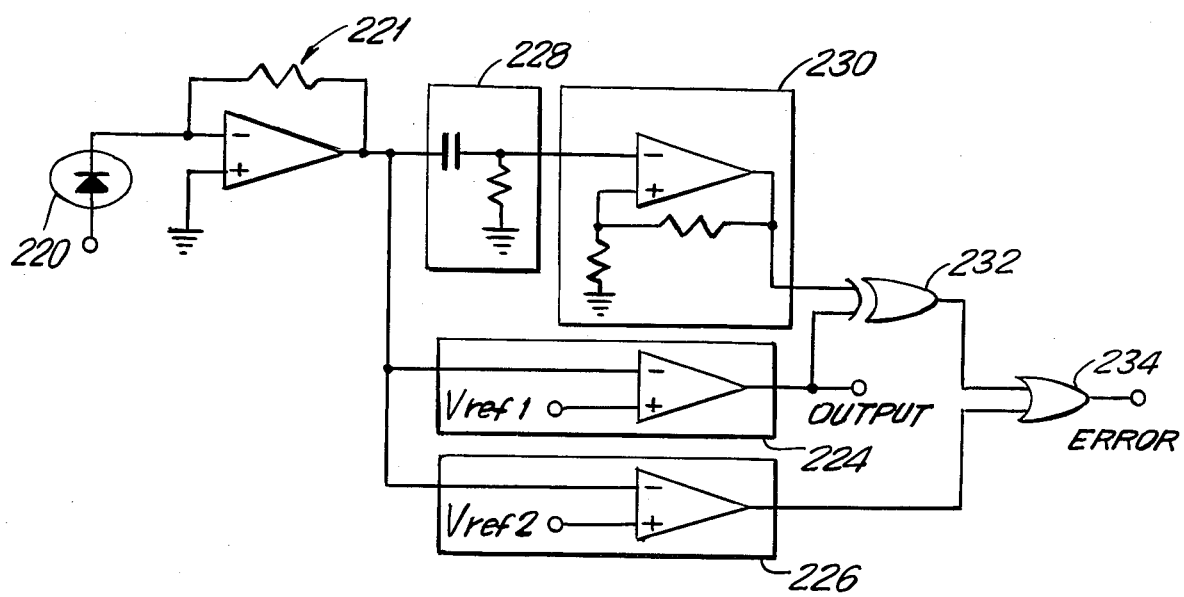
FIG. 3 is a circuit diagram of one circuit appropriate for use in the error detection system of FIG. 2.

By way of example only, one circuit which is contemplated for use in the error detection system of the present invention is shown in the schematic diagram of FIG. 3. As there shown, electrical signals from photodiode 220 are amplified by an amplifier 221. The output of amplifier 221 becomes the input for the threshold and error detection system. As shown, the ON-OFF threshold detector 224 and the disconnect threshold detector 226 are comparators whose output is ON or "high" whenever the input signal falls below a preset level. The slope detector 228 is simply a resistor-capacitor (RC) circuit having a time constant approximating the sensor switching time so that only rapidly changing signals are permitted to pass through to latch 230. Latch 230 is, in turn, an operational amplifier connected with positive feedback. Latch 230, ON-OFF threshold detector 224 and disconnect threshold detector 226 are all shown connected so as to invert the signal. That is, the input of each is to the "minus" terminal. The circuit is thus shown since amplifier 221 is shown as an inverting amplifier. This configuration has certain practical advantages since inverting amplifiers are more common than non-inverting amplifiers and since an inverting latch is somewhat easier to construct than a non-inverting latch.

In use, the threshold and error detection system is connected to the output of the amplified detector signal of a two-state fiber optic sensor. ON-OFF threshold detector 24 monitors the detector signal to determine the state of the sensor vis a vis the parameter of interest being sensed. Disconnect threshold detector 26 monitors the low level detector signal which results from the constant optical feedback within the sensor. Should the detector signal drop below the disconnect threshold, an error signal is triggered to indicate that the sensor has become disconnected or otherwise deactivated. Finally, slope detector 28 monitors the rate of change of the detector signal. Where the detector signal changes rapidly enough to trigger the slope detector, i.e. where the rate of change is greater than or equal to the normal switching speed of the sensor, the detector signal is passed to latch 30, which acts as a memory of the last transition which was rapid enough to trigger the slope detector. The output of latch 30, which corresponds to the ON-OFF state of the last signal received from the slope detector, is compared by comparator 32 to the output signal of ON-OFF threshold detector 24. Should a discrepancy occur between the outputs of latch 30 and ON-OFF threshold detector 24 the output signal of comparator 32 will go high to indicate a gradual sensor failure. That is, where the sensor gradually deteriorates to the point that the detector signal falls below the threshold value of the ON-OFF threshold detector at a rate below the rate necessary to trigger slope detector 28, i.e. below the normal sensor switching rate, the status of ON-OFF threshold detector 24 will not be the same as the output of latch 30 and comparator 32 will indicate that an error has occurred. Comparator 34 will activate an error signal when either comparator 32 or disconnect threshold detector 26 indicates that a sensor failure has occurred.

Thus, it will be apparent that the error detection system according to the present invention advantageously provides an error signal when either a total sensor failure due to disconnection or a gradual sensor failure due to system degradation occurs. Surprisingly, both types of error detection are provided in a light weight, compact electronics package which does not require additional fiber optic sensor channels and which does not add appreciably to the size, weight or cost of the sensor.

To the extent not already indicated, it also will be understood by those of ordinary skill in the art that any one of the various specific embodiments herein described and illustrated may be further modified to incorporate features shown in other of the specific embodiments.

The invention in its broader aspects therefore is not limited to the specific embodiments herein shown and described but departures may be made therefrom within the scope of the accompanying claims without departing from the principles of the invention and without sacrificing its chief advantages.

What is claimed is:

1. A two-state fiber optic sensor comprising:
   a light source;
   transducer means for modulating light in a manner indicative of the parameter being sensed;
   first fiber optic means for transmitting light from said light source to said transducer means;
   detector means for sensing light from said transducer means to produce a detector signal;
   second fiber optic means for transmitting light from said transducer means to said detector means;
   ON-OFF threshold detector means for determining whether said detector signal exceeds a threshold value indicative of the parameter of being sensed;
   first error detection means for determining whether said detector signal is below a minimum threshold value indicative of sensor failure;
   second error detection means for monitoring the rate of change of said detector signal to determine whether gradual sensor failure has occurred.

2. The fiber optic sensor according to claim 1 wherein said first error detection means further comprise a disconnect threshold detector, said disconnect threshold detector producing a disconnect signal when said detector signal is less than said minimum threshold value.

3. The fiber optic sensor according to claim 2 wherein said minimum threshold value is less than the detector signal corresponding to a low level optical signal detected by said detector means even when said ON-OFF threshold detector is in the OFF state.

4. The fiber optic sensor according to claim 2 wherein said second error detection means further comprise:
   slope detector means for monitoring the rate of change of said detector signal, said slope detector means permitting said detector signal to pass where said detector signal rate of change is equal to or exceeds the rate of change associated with normal operation of the sensor, said slope detector preventing said detector signal from passing where said rate of change is less than the rate of change associated with normal operation of the sensor; and
   latch means for receiving detector signals permitted to pass by said slope detector means, said latch means storing the immediately preceding detector signal having a sufficiently rapid rate of change to trigger said slope detector and producing a latch ON-OFF signal corresponding to said immediately preceding detector signal.

5. The fiber optic sensor according to claim 4 wherein said second error detection means further includes first comparator means for comparing the output of said ON-OFF threshold detector to the output of said latch, said first comparator means having no output where said outputs of said ON-OFF threshold detector and said latch are the same, and said first comparator means producing a gradual sensor failure signal where said outputs of said ON-OFF threshold detector and said latch are different.

6. The fiber optic sensor according to claim 5 further including:
   second comparator means for receiving said disconnect signal from said disconnect threshold detector and said gradual sensor failure signal from said first comparator means, said second comparator means activating an error signal upon receiving either said disconnect signal or said gradual sensor failure signal.

7. In a two-state fiber optic sensor having an ON-OFF threshold detector which receives a detector signal, the improvement comprising an error detection system including:
   disconnect threshold detector means for monitoring a low level return detector signal below the threshold value of said ON-OFF threshold detector, said disconnect threshold detector means producing a disconnect signal where said low level return signal is below a minimum disconnect threshold value.

8. In a two-state fiber optic sensor having an ON-OFF threshold detector which receives a detector signal, the improvement comprising an error detection system including:
   slope detector means for monitoring the rate of change of said detector signal, said slope detector means permitting said detector signal to pass where said rate of change is equal to or exceeds the rate of change associated with normal operation of the sensor, said slope detector means preventing said detector signal from passing where said rate of change is less than the rate of change associated with normal operation of the sensor; and
   latch means for receiving rapidly changing detector signals permitted to pass by said slope detector means, said latch means storing the immediately preceding detector signal having a sufficiently rapid rate of change to trigger said slope detector, said latch means producing a latch ON-OFF signal corresponding to said immediately preceding detector signal; and
   first comparator means for comparing said latch ON-OFF signal to said ON-OFF threshold detector output, said first comparator means having no output where said latch ON-OFF signal and said ON-OFF threshold output are the same, said first comparator means producing a gradual sensor failure signal where said latch ON-OFF signal and said ON-OFF threshold detector output are different.

9. The error detection system according to claim 8 further comprising disconnect threshold detector means for monitoring a low level return detector signal below the threshold value of said ON-OFF threshold detector, said disconnect threshold detector means producing a disconnect signal where said low level return signal is below a minimum disconnect threshold value.

10. The error detection system according to claim 9 further comprising second comparator means for receiving the output of said first comparator means and said disconnect threshold detector, said second comparator means activating an error signal when either said gradual sensor failure signal or said disconnect signal is received.

11. The error detection system according to claim 8 wherein said slope detector means further comprise an RC circuit having a time constant approximating the normal switching time of the two-state fiber optic sensor.

12. The error detection system according to claim 11 wherein said latch means further comprise an operational amplifier with positive feedback.

* * * * *

UNITED STATES PATENT AND TRADEMARK OFFICE
CERTIFICATE OF CORRECTION

PATENT NO. : 4,762,992

DATED : August 9, 1988

INVENTOR(S) : Erann Gat, Eric D. Park and Talmage Mathis

It is certified that error appears in the above-identified patent and that said Letters Patent is hereby corrected as shown below: Title page:

In the Abstract at line 22, after "changing detector" insert --signal--

Column 1, line 28, after "of" insert --a--

Signed and Sealed this

Twenty-ninth Day of November, 1988

Attest:

DONALD J. QUIGG

*Attesting Officer*  *Commissioner of Patents and Trademarks*